United States Patent [19]

Stephens et al.

[11] Patent Number: 4,575,776
[45] Date of Patent: Mar. 11, 1986

[54] MAGNETIC RECORDING DISK FILE SERVO CONTROL SYSTEM INCLUDING AN ACTUATOR MODEL FOR GENERATING A SIMULATED HEAD POSITION ERROR SIGNAL

[75] Inventors: Harold C. Stephens; Michael L. Workman, both of San Jose, Calif.

[73] Assignee: International Business Machines Corporation, Armonk, N.Y.

[21] Appl. No.: 451,582

[22] Filed: Dec. 20, 1982

[51] Int. Cl.[4] ............... G11B 21/08; G11B 21/10
[52] U.S. Cl. ............................. 360/78; 360/77; 318/561; 318/636
[58] Field of Search ........... 360/77, 78, 75; 369/32, 369/33, 41; 318/615–618, 636, 561, 571, 620

[56] References Cited

U.S. PATENT DOCUMENTS

| 4,133,011 | 1/1979 | Kurzweil | 360/78 |
| 4,297,734 | 10/1981 | Laishley et al. | 360/78 |
| 4,477,755 | 10/1984 | Rickert | 360/78 |

OTHER PUBLICATIONS

IBM TDB, vol. 21, No. 5, "Offset Force Correction for Disk File", Mantey, Oct. 1978, pp. 1792–1795.
IBM Technical Disclosure Bulletin, vol. 21, No. 2, Jul. 1978—pp. 804–805, "Quad-Burst PES System for Disk File Servo"—Herrington & Mueller.

*Primary Examiner*—Donald McElheny, Jr.
*Assistant Examiner*—Steven R. Garland
*Attorney, Agent, or Firm*—Walter J. Madden, Jr.; Thomas R. Berthold

[57] ABSTRACT

A servo system for a magnetic disk file having a voice coil motor (VCM) actuator generates a position error signal (PES) from servo information recorded on one of the disks. An electrical model of the VCM is employed through which a measure of the VCM electrical current is passed to generate a simulated PES signal which is continuous even if the regular PES is sampled or intermittent.

4 Claims, 20 Drawing Figures (A) CONTINUOUS POSITION VARIABLE, (B) PES, AND (C) PES*

$K_F$ = VCM FORCE CONSTANT
$S$ = LAPLACE TRANSFORM
$M$ = MASS OF VCM LOAD
$K_x$ = POSITION SIGNAL GAIN
$I$ = VCM CURRENT

VCM MODEL (SIMULATED SAMPLE WAVEFORMS ARE FOR A 4 TRACK SEEK)

$$K_V = \frac{K_F}{M} \cdot VSF$$

VSF = VELOCITY SCALE FACTOR

MAGNETIC RECORDING DISK FILE SERVO CONTROL SYSTEM INCLUDING AN ACTUATOR MODEL FOR GENERATING A SIMULATED HEAD POSITION ERROR SIGNAL

BACKGROUND OF THE INVENTION

1. Field of the Invention

This invention relates to track-seeking and track-following servo systems for magnetic disk files.

2. Description of the Prior Art

In order to read and write data on a magnetic disk file, the read/write heads must be positioned over the desired one of a plurality of concentric recording tracks. The minimum distance between tracks is determined by the accuracy of the head positioning servo mechanism and the ability of the read/write channel to function with offtrack error. Increasing the track density (tracks per inch) necessitates decreasing the positioning error.

Present state of the art high performance disk files use a single servo head and a dedicated servo disk surface on which position information is written. The data read/write heads are all mechanically linked to the servo head so that once the servo head is on track, the data heads should be on track. However, the mechanical linkage between the servo head and data heads is a source of large misalignment error. Misalignment of the servo and data heads has dynamic and static components, including thermal drift and tilt of the carriage assembly which carries the heads.

Study of the economics of future generation disk files indicates that a new method of servoing the data heads to the data tracks is needed. The error between the servo head and the data heads is every large and will be expensive to eliminate using present servoing techniques (if it is at all possible).

There are two basic approaches to achieving the higher track density goal. The more complex of these is the so-called imbedded servo, and the second is sectorized or sampled data servo. Imbedded servo is the name for a technique in which the servo position information is imbedded in or written with the data on each track. In embedded servo, the position information comes from the track it is desired to servo on. Imbedded servo implies the ability to read and write data on a track without erasing the position information, and the ability to read the position information while reading or writing data, a difficult task at best.

In the sector servo approach, the positioning information also comes from the track to be servoed on, but at the expense of losing some data space. The method involves writing small patches or sectors of position information between large portions of data, with each sector of position information being used to control the servo system during the subsequent data portion.

While the technique of sector servo is not as elegant as that of imbedded servo, many of the problems of its implementation have already been solved. Low capacity/low performance disk files are presently on the market which use sector servo, but due to the large number of sectors needed (wsting up to 50% of the data space), the sector servo approach has not been applied to high performance drives.

SUMMARY OF THE INVENTION

A technique which allows the use of sector servo on high performance disk drives without an excess loss of data space or a degradation in performance is provided in accordance with the present invention. The invention involves the generation of a simulated position error signal (PES) using a model of the voice coil motor (VCM) used as the disk file actuator, and employing this simulated PES to generate PES and velocity outputs for servo control.

DESCRIPTION OF THE PREFERRED EMBODIMENT

Most velocity transducer implementations for high performance disk file servos are open loop filters which provide an estimate of the head velocity based on the current in the VCM and position error signals obtained from the servo pattern.

A fundamental purpose of the present invention is to provide an accurate continuous PES signal and velocity signal from sampled position information with which present analog servo techniques can be used. To create the continuous PES and velocity signals, the invention uses the information recorded in the position sectors as well as the continuous VCM current signal. One servo pattern with which the present invention may be employed is the so-called "quad burst" pattern described in IBM Technical Disclosure Bulletin, Vol. 21, No. 2, July 1978, pp804–5, entitled "Quad Burst PES System for Disk File Servo", which is incorporated herein by reference.

Figure 1:
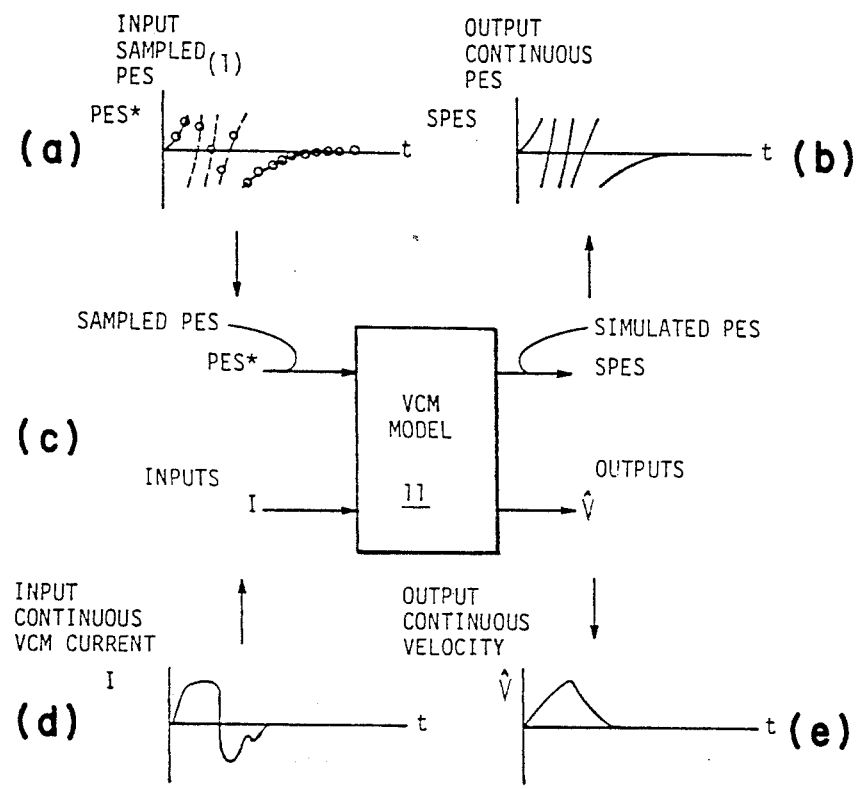
FIG. 1 shows, in parts (a) and (b), the input sampled PES and output continuous simulated PES respectively, in part (c) the VCM model with input and output, and in parts (d) and (e) the VCM input current to the model and the velocity output from the model, respctively.
Figure 2:
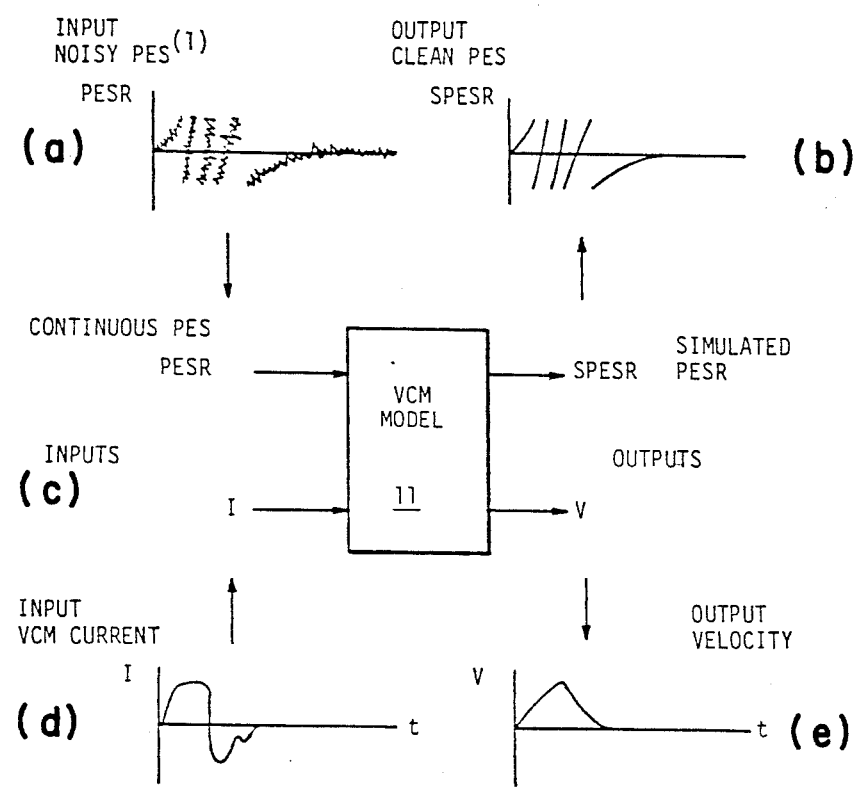
FIG. 2 shows, in parts (a) and (b) the input continuous PES and output continuous simulated PES, respectively, in part (c) the VCM model with continuous input and output, and in parts (d) and (e), the VCM input current to the model and the velocity output from the model, respectively.

The basic functional form of the present invention using position samples is shown in FIG. 1 for a four-track seek operation. The two inputs are position sample signals PES* and the VCM current supplied to a network 11 in accordance with the present invention. From these inputs, the present invention constructs very accurate continuous PES (SPES) and velocity signals. It should be noted that the position input does not have to be sampled. In the case of a continuous servo signal, the present invention provides a velocity signal and a filtered PES signal (SPESR) at its outputs. The continuous mode, shown functionally in FIG. 2, is useful for obtaining the velocity information needed in any high performance servo.

In the case of position samples from a servo sector, when a sector is read, the position information within it is converted into a voltage which represents the distance of the head from the track center. The track address is also read from the sector and stored in a latch. The analog voltage and track address represent an instantaneous sample of the position of the head. In a continuous system the analg voltage is continuously available, and is called the PES because it represents the error in position of the heads relative to the nearest track center. The continuous position, PES, and sampled PES (PES*) are shown as a function of time for a four-track seek in FIGS. 3a, b, c. Note that the scale factor of the PES or PES* will be on the order of 10,000 volts per inch, but the absolute position signal shown in FIG. 3(a) would have to be scaled to about 10 volts per inch in order to realize it in electronic circuitry (for a one inch stroke length).

Figure 3:
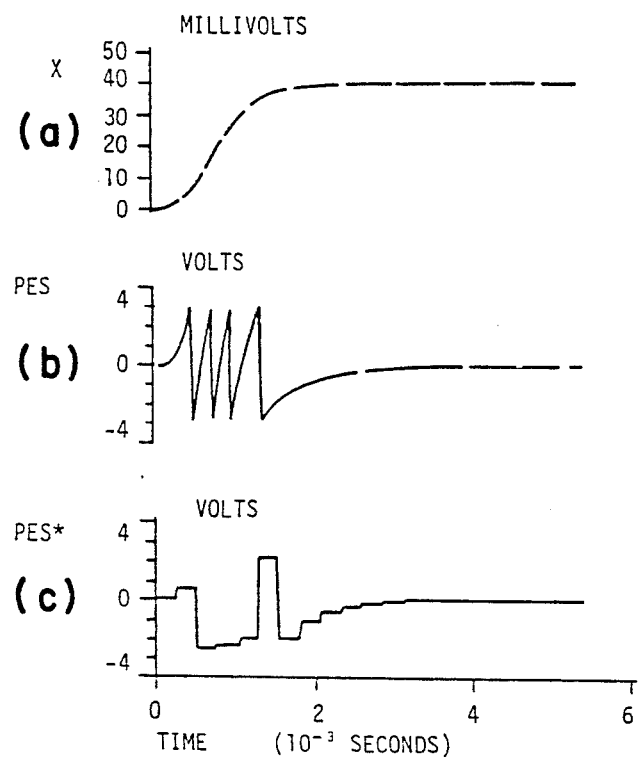
FIG. 3 consisting of parts (a), (b) and (c) is a graph of the variables of head position 37 X", position error signal "PES" for a continuous servo system, and position error signal "PES*" for a sampled servo system, respectively.
Figure 4:
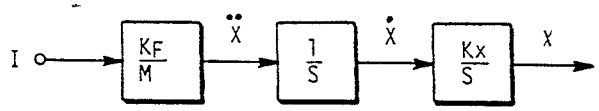
FIG. 4 shows a model of a VCM used in a disk file actuator.

Equations 1–4 below describe the model of the VCM shown in FIG. 4.

$$F(S) = K_F * I(S) \text{ (lbs)} \quad (1)$$

$$ACC(S) = F(S)/Mass \text{ (in/sec*sec)} \quad (2)$$

$$Vel(S) = ACC(S)/S \text{ (in/sec)} \quad (3)$$

$$X(S) = Vel(S)/S \text{ (in)} \quad (4)$$

where
$K_F$ = VCM Force Constant (lbs/amp)
S = Laplace Transform Operator
X = Position
I = VCM current When the current signal from the VCM is supplied as an input to an electronic model of the VCM, the output is an approximation to the continuous position signal shown in FIG. 3(a). However the limited dynamic range of the electronic signal would force a scale factor of about 10 volts per inch. A key concept in the present invention is the incorporation of the track-crossing PES modulation into the model shown in FIG. 4, because it allows the scale factor to be on the order of 10,000 volts per inch. The VCM model in FIG. 5 includes an integrator 12, a second integrator 13 and a hysteretic rule circuit 14.

Hysteretic rule circuit 14 controls switches 16 and 17, and is driven by the output position signal from integrator 13. Circuit 14 operates to vary switches 16 and 17 when the head is exactly between two track centerlines, and changes the position signal so that it is referenced to the nearest track centerline. Circuit 14 is also operable to generate estimated cylinder pulses for each estimated track crossing through a single shot 20. The waveforms at the different sections of the model circuitry of FIG. 5 are shown above the circuits.

Figure 5:
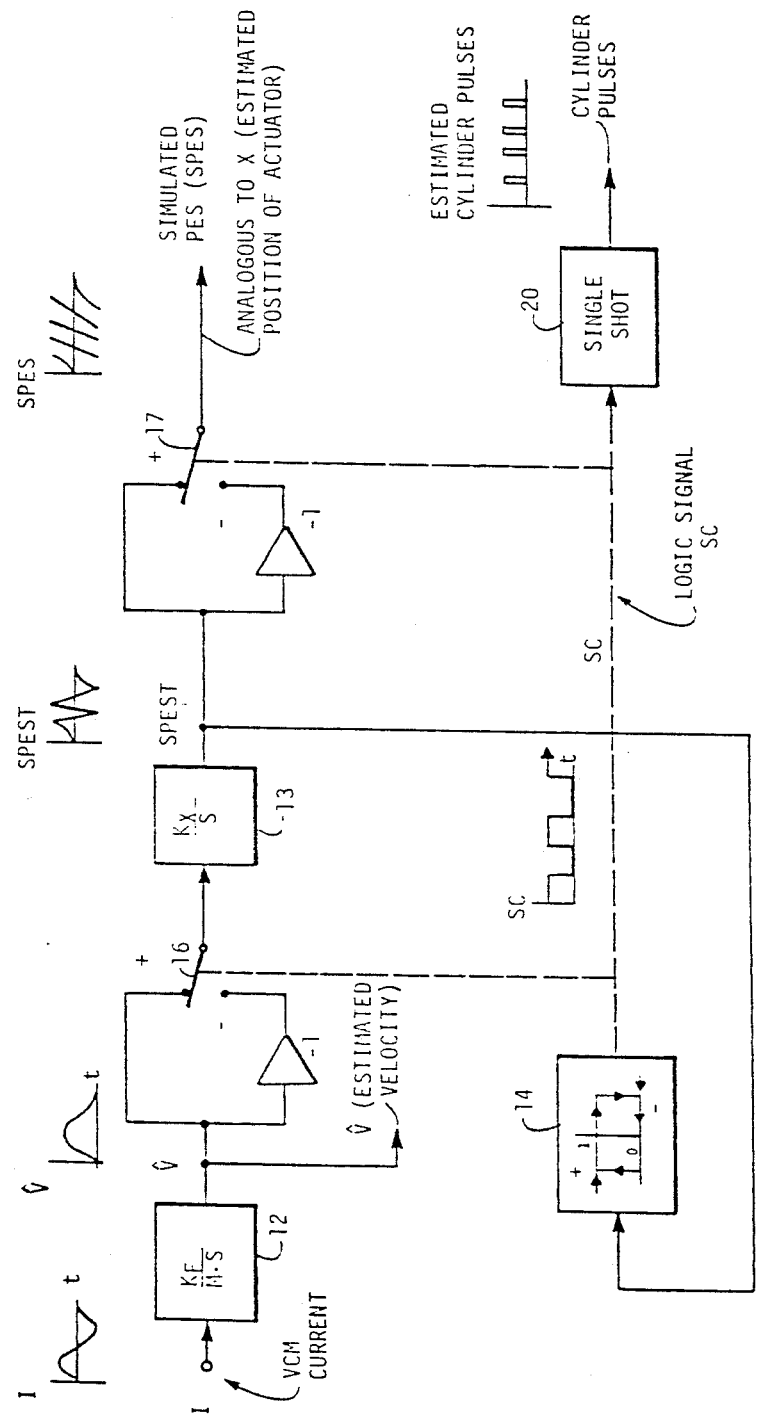
FIG. 5 shows the model of FIG. 4 as modified by the present invention.
Figure 6:
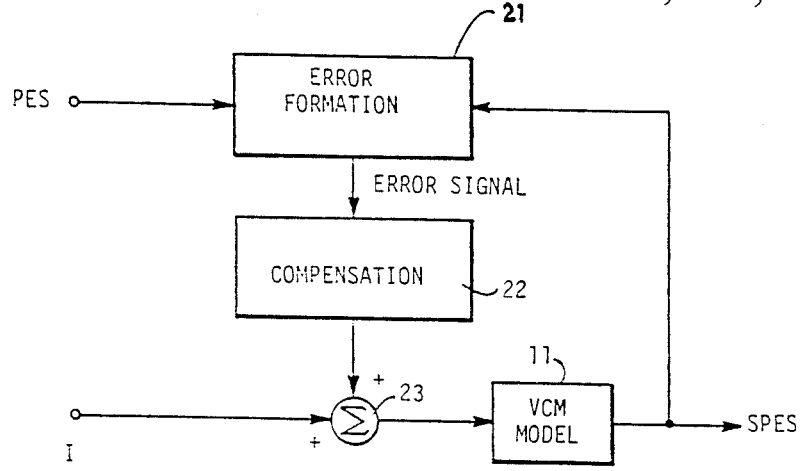
FIG. 6 illustrates the correction of the simulated PES signal by comparison with the sampled PES signal.
Figure 7:
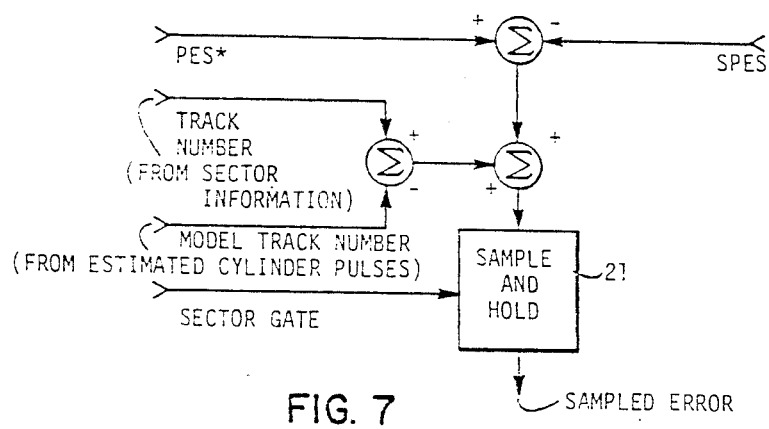
FIGS. 7 and 8 show the formation of the continuous and sampled error signals respectively.
Figure 8:
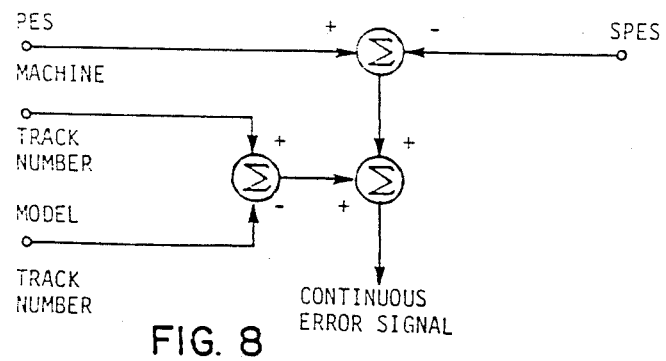

The critical problem to overcome is that the VCM model is only a rough approximation to the real hardware, so that the SPES output in FIG. 5 will not match the PES exactly. However, the model input can be corrected based on a comparison of the real PES and SPES. This is shown in FIG. 6, and the formation of the error signal from sampled signals is shown in FIG. 7. In FIG. 6, the PES and SPES signals are supplied as inputs to an error formation network 21, and the output of network 21 is supplied as a comparison error signal to a compensation network 22. Compensation circuit 22 is an electronic network made of poles and zeros which produce the desired closed loop transfer function. The output of compensation network 22 is summed in a summing junction 23 with the VCM current signal I for supply to the VCM model 11 shown in FIG. 5. The bandwidth of the continuous error signal is low (less than 2000 Hz), and the information in it can be used in sampled data form. The PES* can be used instead of the continuous PES in the sampled data mode because the error is only calculated once per sector. FIG. 8 is the continuous signal version of FIG. 7. When the PES* is present, the sector gate signal lets the sample and hold circuitry 24 sample. Between sectors, the sample and hold block holds the sampled error signal.

Figure 9:
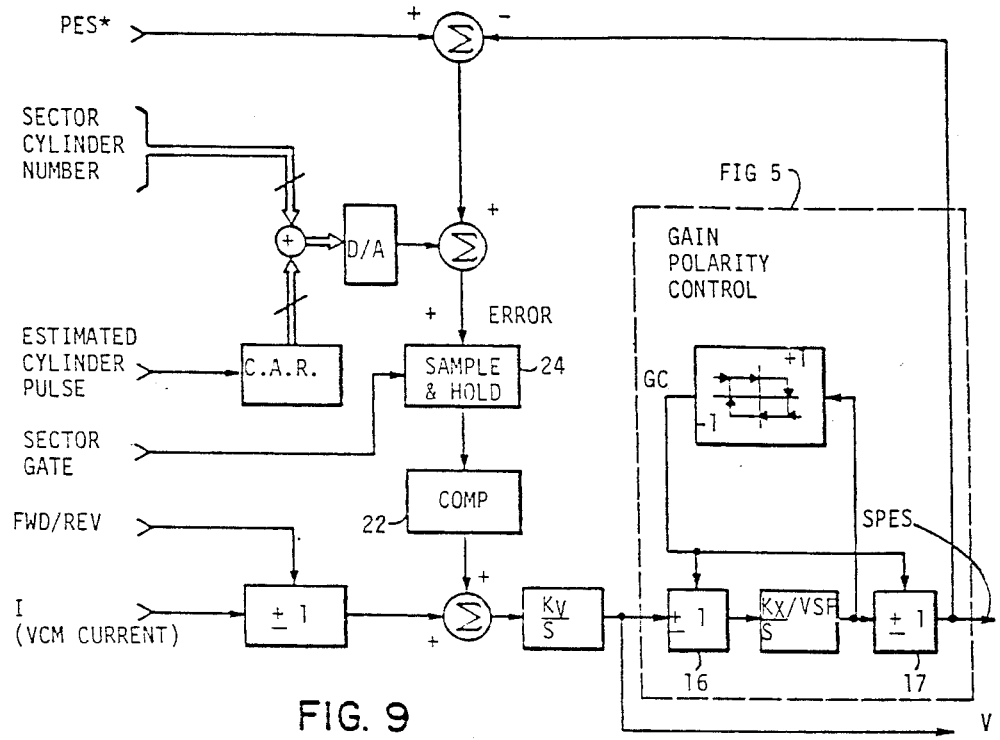
FIGS. 9 and 10 illustrate the operation of the present invention for sampled and continuous operation.
Figure 10:
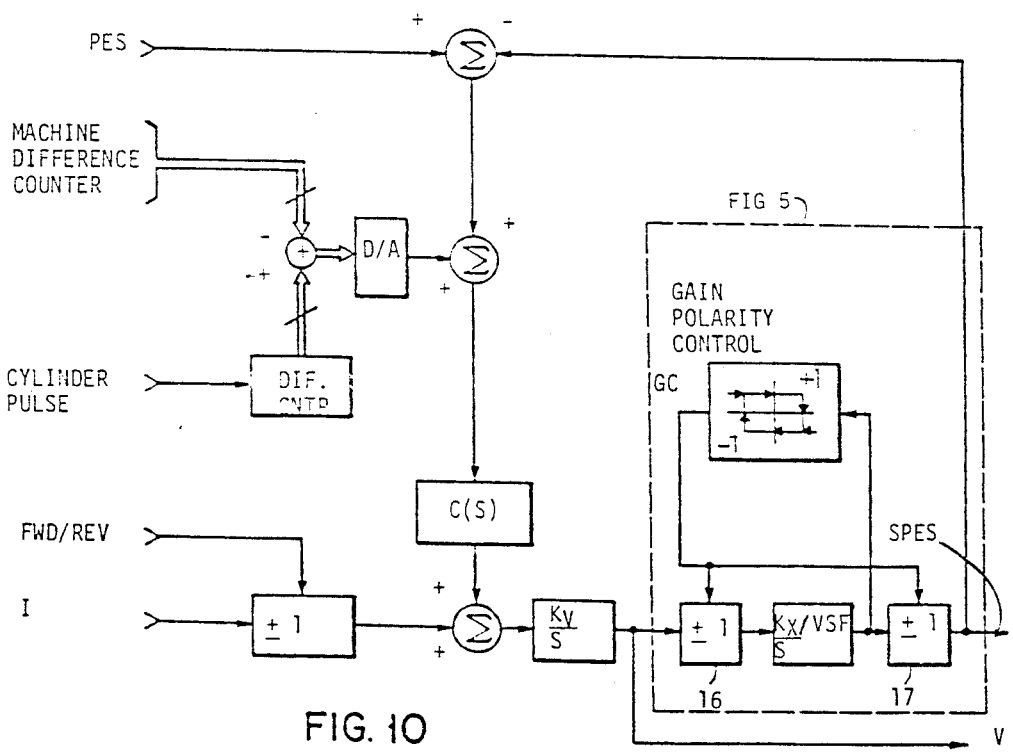

Using the above concept, a device can be built which takes in position samples PES* and VCM current I and produces a continuous simulated PES (SPES) and velocity signal. The block diagram of this device is shown in FIG. 9 for sampled position, and in FIG. 10 for continuous position. The continuous mode of operation is of interest because the SPES is much less noisy than the PES, and the velocity output signal is very accurate.

As shown in these figures, the actual track or cylinder number is compared with the estimated track or cylinder number generated in the model, and any difference is added to the difference between the SPES and the PES* or PES as shown in FIGS. 7 and 8.

The architecture of the present invention is based on two facts: (1) the PES* contains accurate low frequency information about position, but its high frequency information is limited to the Nyquist frequency (half the sampling frequency), and (2) the VCM current contains accurate high frequency information about acceleration, but contains significant noise in the lower frequencies.

We claim:

1. A servo system for a magnetic disk file in which an electrically driven voice coil motor (VCM) actuator moves a magnetic servo head to different concentric recording tracks on a magnetic recording disk file, said disk file having recorded thereon a servo pattern which produces a position error signal (PES) in said servo head which is a measure of the displacement of said servo head from the centerline of one of said tracks, comprising:

an electrical model of said VCM, said model further comprising means for receiving a first measure of the current in said VCM, and means, including a hysteretic switch, for generating a signal representative of the estimated track location of said servo head and for generating a simulated PES in response to the measure of VCM current received;

means for continuously supplying a first measure of the current in said VCM;

means for comparing the simulated PES with said PES to generate a comparison error signal;

means for generating a signal which is a measure of the actual track location of said servo head;

means for comparing said estimated track location signal from said model with said actual track location signal to generate a track location error signal; and means for combining said comparison error signal, said track location error signal, and said second measure of VCM current to form said first measure of VCM current supplied to said model.

2. A system in accordance with claim 1 in which said electrical model of said VCM receives VCM current as the input, provides head position as the output and has a transfer function of the form $K_F K_x / M S^2$, where $K_F$ = VCM Force Constant,
$M$ = Mass of VCM Load,
$S$ = Laplace Transform Operator, and
$K_x$ = Position Signal Gain.

3. A servo system in accordance with claim 1 in which said servo pattern is intermittent around the surface of said disk.

4. A servo system in accordance with claim 1 in which said servo pattern is continuous around the surface of said disk.

* * * * *

UNITED STATES PATENT AND TRADEMARK OFFICE
CERTIFICATE OF CORRECTION

PATENT NO. : 4,575,776
DATED : March 11, 1986
INVENTOR(S) : Harold C. STephens and Michael L. Workman It is certified that error appears in the above-identified patent and that said Letters Patent is hereby corrected as shown below:

IN THE SPECIFICATION

Column 1, line 35, "every" should be --very--.

Column 1, line 62, "wsting" should be --wasting--.

IN THE CLAIMS

Column 4, line 55, "first" should be --second--.

Signed and Sealed this

Twenty-sixth Day of August 1986

[SEAL]

Attest:

DONALD J. QUIGG

Attesting Officer    Commissioner of Patents and Trademarks